US008014601B2

(12) United States Patent
Takahashi

(10) Patent No.: US 8,014,601 B2
(45) Date of Patent: Sep. 6, 2011

(54) PATTERN RECOGNIZING APPARATUS, PATTERN RECOGNIZING METHOD AND PATTERN RECOGNIZING PROGRAM

(75) Inventor: Katsuhiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 650 days.

(21) Appl. No.: 12/093,407

(22) PCT Filed: Nov. 15, 2006

(86) PCT No.: PCT/JP2006/322731
§ 371 (c)(1),
(2), (4) Date: May 12, 2008

(87) PCT Pub. No.: WO2007/063705
PCT Pub. Date: Jun. 7, 2007

(65) Prior Publication Data
US 2009/0268964 A1    Oct. 29, 2009

(30) Foreign Application Priority Data
Nov. 29, 2005  (JP) ................................. 2005-344233

(51) Int. Cl.
*G06K 9/00* (2006.01)
(52) U.S. Cl. ........................................ 382/168; 382/170
(58) Field of Classification Search .................. 382/168, 382/170, 260, 274, 276; 358/522
See application file for complete search history.

(56) References Cited

U.S. PATENT DOCUMENTS

| | | | |
|---|---|---|---|
| 5,625,717 A | 4/1997 | Hashimoto et al. | |
| 5,818,978 A | 10/1998 | Al-Hussein | |
| 5,835,628 A | 11/1998 | Farrell | |

FOREIGN PATENT DOCUMENTS

| | | |
|---|---|---|
| JP | 8-77300 A | 3/1996 |
| JP | 8-287246 A | 11/1996 |
| JP | 2000-40153 A | 2/2000 |
| JP | 2001-266143 A | 9/2001 |
| JP | 2002-279422 A | 9/2002 |
| JP | 2004-180000 A | 6/2004 |

OTHER PUBLICATIONS

Heikkonen J. et al. "A computer vision approach to digit recognition on pulp bales" Pattern Recognition Letters, Elsevier, Amsterdam, NL, vol. 17, No. 4, Apr. 4, 1996, pp. 413-419 XP004021746 ISSN: 0167-8655 Section 2.
Abak A T et al. The performance evaluation of thresholding algorithms for optical character recognition Proceedings of the 4th International Conference on Document Analysis and Recognition. (ICDAR). ULM, Germany, Aug. 18-20, 1997; [Proceedings of the ICDAR], Los Alamitos, IEEE Comp. Soc, US, vol. 2, pp. 697-7000 XP 010244817.

*Primary Examiner* — Duy M Dang
(74) *Attorney, Agent, or Firm* — Sughrue Mion, PLLC

(57) ABSTRACT

A pattern recognizing method for matching a binary or ternary reference image and an input grayscale image, having a precision similar to the method in which a plurality of binary reference images are generated by supposing settable various binarization threshold value and comparing the distances between the plurality of binary reference images and the grayscale image, and enabling the processing time to be shorter. The first accumulated histogram of the pixels of the grayscale image corresponding to a high density region of the binary reference image and the second accumulated histogram opposite to it and of the pixels of the grayscale image corresponding to the low density region of the reference image are generated and summated. The existence or absence of a pattern is judged by comparing the minimum value of the summated accumulated histogram and a threshold value.

12 Claims, 13 Drawing Sheets

Fig. 12
(a)
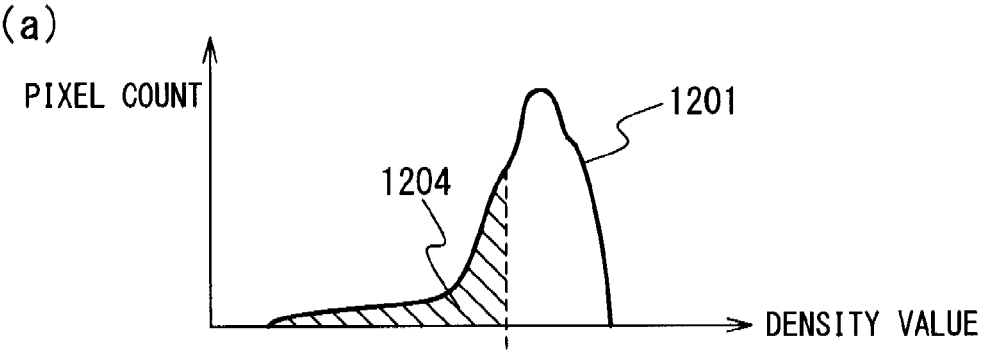
(b)
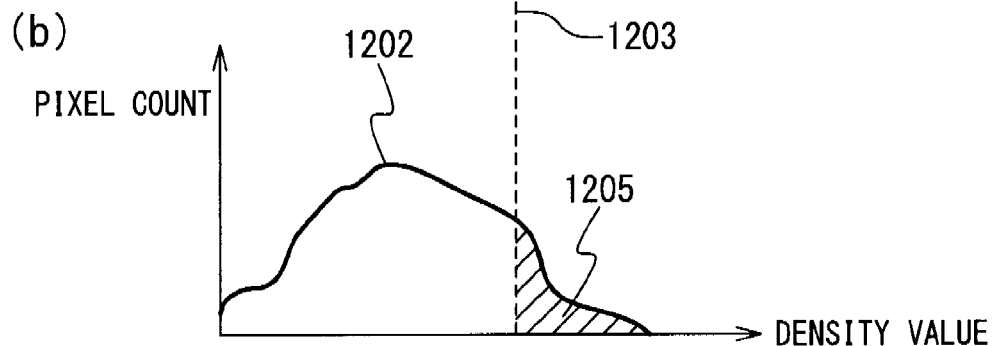

PATTERN RECOGNIZING APPARATUS, PATTERN RECOGNIZING METHOD AND PATTERN RECOGNIZING PROGRAM

TECHNICAL FIELD

The present invention relates to a pattern recognizing apparatus, a pattern recognizing method and a pattern recognizing program for performing a pattern recognition of a grayscale image by comparing with a reference image.

BACKGROUND ART

For matching a grayscale image to a reference image of a binary gradation, there is a method by which the grayscale image is binarized only one time by using a certain binarization algorithm and a template matching is performed between the binary patterns. As an example of the binarization algorithm, the fixed threshold method, p-tile method, and Otsu binarization (a discriminant analysis method) are known. In those methods, there is an advantage that the processing speed is relatively high because the binarizing operation is performed only one time. However, in the binarizing algorithm, prerequisites peculiar for each of the input grayscale images are assumed. Thus, a desired result is obtained only in limited cases.

For example, in the fixed threshold method, an assumed prerequisite is that the density values of the recognition target object region and the density values of the other region can always be discriminated at a stable value (the value is called as a binarization threshold). Thus, in the case of an image whose pixel values are entirely increased or decreased depending on the change in an illumination magnitude, the optimal binarization threshold is increased or decreased so that the fixed threshold method is not suitable for.

In the p-tile method, a prerequisite is that the region formed by the pixels of higher p percent or lower p percent in the pixel value distribution for the entire image is assumed to correspond to the recognition target. If the size of the recognition target in the input grayscale image is changed, for example, the prerequisite is not satisfied so that the p-tile method is not suitable.

In the Otsu binarization method, the histogram of the pixel values in the entire image is assumed to exhibit the shape of two peaks. However, when three or more objects exist in an input image, the histogram does not exhibit the shape of the two peaks in very many cases so that the Otsu binarization method is not suitable for.

A method having looser prerequisites than the foregoing methods is provided. In this method, an input grayscale image is binarized in accordance with a plurality of different thresholds respectively. The respective binarized input images are compared with a reference image to be selected as a final output.

For example, in the method described in Japanese Laid Open Patent Application JP-A-Heisei, 8-287246 (refer to paragraphs [0013] to [0028] and FIG. 1), a plurality of threshold setting methods, such as the p-tile method and the like, are used to generate a plurality of binary images, and the image having the highest evaluation value is selected in accordance with the character recognition for each of them.

In a character recognizing apparatus described in Japanese Laid Open Patent Application JP-A-Heisei, 8-077300 (refer to paragraphs [0073] to [0022] and FIG. 1), until the certainty degree of a character recognition exceeds a predetermined threshold, the binarization threshold is automatically incremented or decremented by a micro amount from an initial value, and the trial and error are repeated, thereby obtaining a desired result.

Also, the following method (referred to as a binary image round-robin method) may be considered. In this method, various settable binarization thresholds are assumed, and the binary images based on the respective binarization thresholds are generated. The distances between the binary images and a reference image are calculated, and the recognition result having the minimum distance value is employed. According to this binary image generation round-robin method, irrespectively of the nature of the input grayscale image, the input grayscale image can be optimally adapted to the reference image. Thus, the highest recognition precision can be attained as compared with the foregoing conventional techniques.

Japanese Laid Open Patent Application JP-P 2004-180000A describes a binarizing method of an image that is intended to automatically binarizing a grayscale image at a high precision.

In Japanese Laid Open Patent Application JP-P 2000-40153A, a binarizing method of an image is described. In this method, the fact that the ruled line and the character have concentrations different from the background color is used, and even if any color is used in the ruled-line, the character and the background, the character and the ruled line are clearly displayed.

DISCLOSURE OF INVENTION

The binary image generation round-robin method can optically adapt an input grayscale image to the reference image, irrespectively of the nature of the input grayscale image. However, a binarizing process and a distance calculating must be repeated the same times as the number of the set binarization thresholds. Thus, there is a problem that the processing time is very long.

The present invention is developed to solve the above-mentioned problems and is intended to provide a pattern recognizing apparatus, a pattern recognizing method and a pattern recognizing program, by which a result of the same quality as the binary image generation round-robin method can be obtained at a higher speed.

The pattern recognizing apparatus according to the present invention is characterized by including: a storing section configured to store a reference image being binarized and having a high density region and a low density region and an input grayscale image to be matched with the reference image; a first accumulated histogram extracting section configured to extract a first accumulated histogram generated by accumulating pixels whose density value is less than a given value among pixels of the input grayscale image and corresponding to the high density region of the reference image; a second accumulated histogram extracting section configured to extract a second accumulated histogram generated by accumulating pixels whose density value is more than a given value among pixels of the input grayscale image and corresponding to the low density region of the reference image; an accumulated histogram summating section configured to generate a summated accumulated histogram by summating the first accumulated histogram and the second accumulated histogram; and a pattern matching section configured to recognize the input grayscale image by using a distance value of the reference image and the input grayscale image which is a minimum value of the summated histogram generated by the accumulated histogram summating section.

The principle is described below with reference to FIG. 12, under which the pattern recognition processing can be executed based on the distance value when an input grayscale image and a reference image are optimally matched by the foregoing configuration. FIG. 12 is a view for explaining a density histogram (the lateral axis indicates the density and the longitudinal axis indicates the number of the pixels) used in the pattern recognition processing. FIG. 12(a) shows a density histogram 1201 for the pixels in the input grayscale image corresponding to the pixels in the high density region of the reference image, and FIG. 12(b) shows a concentration histogram 1202 for the pixels in the input grayscale image corresponding to the pixels in the low density region of the reference image. In order to binarizing, when a binarization threshold 1203 is set, a low density region 1204 whose density value is lower than the binarization threshold 1203 exists in the density histogram 1201, and a high density region 1205 whose density value is higher than the binarization threshold 1203 exists in the density histogram 1202.

Here, let us consider the determination of the city block distance between the binary image obtained by binarizing the input grayscale image using the binarization threshold value 1203 and the reference image. The city block distance is the distance when k=1 is set in the Minkowski metric equation represented by the (A1) equation.

$$L_k(a, b) = \left(\sum_{i=1}^{d} |a_i - b_i|^k\right)^{1/k} \quad (A1)$$

Here, ai and bi indicate the values of the respective pixels of the binary image obtained by binarizing the grayscale image using a tentative binarization threshold 1203 and the values of the respective pixels of the reference image, and d indicates the number of the pixels, respectively. Also, when the pixel value 1 is assigned to the pixel having the binarization threshold 1203 or more in the grayscale image and when the pixel value 0 is assigned to the pixel having the binarization threshold 1203 or less, the values ai and bi are 0 or 1, respectively. Thus, the value of |ai−bi| has any value of the following four cases.
Case 1: When ai=0 and bi=0, |ai−bi|=0,
Case 2: When ai=0 and bi=1, |ai−bi|=1
Case 3: When ai=1 and bi=0, |ai−bi|=1
Case 4: When ai=1 and bi=1, |ai−bi|=0
Here, let us pay attention to the cases 2 and 3 that are |ai−bi|=1.

The city block distance is equal to, in accordance with the value of the pixel pairs of a pixel on the reference image and a pixel on the binary input image linked to each other, the summation of the number of the pixel pairs which is positioned in the high density region on the reference image and having the pixel value 0 in the binary image) and the number of the pixel pairs which is positioned in the low density region in the reference image and having the pixel value 1 in the binary image. The first term is equal to the value of the area of the low density region 1204, and the second term is equal to the value of the area of the high density region 1205.

Then, the first accumulated histogram and second accumulated histogram in the present invention correspond to the areas of the low density region 1204 and the high density region 1205 when the binarization threshold 1203 is assumed to be various values, respectively. Further, from the equation (A1), the minimum value of the summated accumulated histogram obtained by summating them is equal to the minimum value of the city block distance between the reference image and the binary image in which the grayscale image is tenta- tively binarized. Thus, by choosing the minimum value in the summated accumulated histogram, the city block distance when the grayscale image is optimally adapted to the reference image can be obtained, irrespectively of the characteristics of the input image. Hence, the judgment can be carried out in accordance with this.

Also, the city block distance between the tentative binary image and the reference image can be calculated without actually binarizing the input grayscale image to generate the binary image. Thus, the binarization processing and the image-based distance calculation is not required. Hence, the recognition processing can be performed at the speed higher than the binary image generation round-robin method.

Also, the pattern recognizing apparatus according to the present invention is characterized by including: a storing section configured to store a reference image being binarized and having a high density region and a low density region, an input grayscale image to be matched with the reference image, and a weighting image having weighting values for every pixel; a first accumulated histogram extracting section configured to extract a first accumulated histogram by accumulating the weighting values of the weighting image corresponding to pixels in the high density region of the reference image and whose density values are larger than a given value; a second accumulated histogram extracting section configured to extract a second accumulated histogram by accumulating the weighting values of the weighting image corresponding to pixels in the low density region of the reference image and whose density values are smaller than a given value; an accumulated histogram summating section configured to generate a summated accumulated histogram by summating the first accumulated histogram and the second accumulated histogram; and a pattern matching section configured to recognize the input grayscale image by using a distance value of the reference image and the input grayscale image which is a minimum value of the summated histogram generated by the accumulated histogram summating section.

Also, in the pattern recognizing apparatus, the reference image includes a third density region as a non-calculation region. The first accumulated histogram extracting section and the second accumulated histogram extracting section may exclude pixels in the third density region from the extracting of the accumulated histograms. According to such configuration, it is possible to exclude the influence on the distance value that is caused by the match or mismatch of the pixel position which is not effective for the pattern recognition.

Also, preferably, the pattern recognizing apparatus includes: a region setting section configured to set a partial region image from an original image; and a grayscale image scaling section configured to scale the partial region image to become a same image as the reference image, and the grayscale scaling section sets the scaled partial region image as the input grayscale image to be matched with the reference image. According to such configuration, even if the region corresponding to the reference image is a part of the input grayscale image, the region corresponding to the reference image can be detected.

The pattern recognizing method according to the present invention is characterized by including: a step of storing a reference image being binarized and having a high density region and a low density region and an input grayscale image to be matched with the reference image; a step of extracting a first accumulated histogram generated by accumulating pixels whose density value is less than a given value among pixels of the input grayscale image and corresponding to the high density region of the reference image; a step of extracting a second accumulated histogram generated by accumulating pixels whose density value is more than a given value among pixels of the input grayscale image and corresponding to the low density region of the reference image; a step of generating a summated accumulated histogram by summating the first accumulated histogram and the second accumulated histogram; and a step of recognizing the input grayscale image by using a distance value of the reference image and the input grayscale image which is a minimum value of the summated histogram.

Also, the pattern recognizing method according to the present invention is characterized by including: a step of storing a reference image being binarized and having a high density region and a low density region, an input grayscale image to be matched with the reference image, and a weighting image having weighting values for every pixel; a step of extracting a first accumulated histogram by accumulating the weighting values of the weighting image corresponding to pixels in the high density region of the reference image and whose density values are larger than a given value; a step of extracting a second accumulated histogram by accumulating the weighting values of the weighting image corresponding to pixels in the low density region of the reference image and whose density values are smaller than a given value; a step of generating a summated accumulated histogram by summating the first accumulated histogram and the second accumulated histogram; and a step of recognizing the input grayscale image by using a distance value of the reference image and the input grayscale image which is a minimum value of the summated histogram.

Also, in the pattern recognizing method, the reference image may include a third density region as a non-calculation region. At a step of extracting a first accumulated histogram, pixels in the third density region are excluded from the extracting of the first accumulated histogram. At a step of extracting a second accumulated histogram, pixels in the third density region are excluded from the extracting of the second accumulated histogram.

Also, preferably, the pattern recognizing method includes: a step of setting a partial region image from an original image; and a step of scaling the partial region image to become a same image as the reference image, and the scaled partial region image is set as the input grayscale image to be matched with the reference image.

The pattern recognizing program according to the present invention instructs a computer to execute: a step of storing a reference image being binarized and having a high density region and a low density region and an input grayscale image to be matched with the reference image; a step of extracting a first accumulated histogram generated by accumulating pixels whose density value is less than a given value among pixels of the input grayscale image and corresponding to the high density region of the reference image; a step of extracting a second accumulated histogram generated by accumulating pixels whose density value is more than a given value among pixels of the input grayscale image and corresponding to the low density region of the reference image; a step of generating a summated accumulated histogram by summating the first accumulated histogram and the second accumulated histogram; and a step of recognizing the input grayscale image by using a distance value of the reference image and the input grayscale image which is a minimum value of the summated histogram.

Also, the pattern recognizing program according to the present invention instructs the computer to execute: a step of storing a reference image being binarized and having a high density region and a low density region, an input grayscale image to be matched with the reference image, and a weighting image having weighting values for every pixel; a step of extracting a first accumulated histogram by accumulating the weighting values of the weighting image corresponding to pixels in the high density region of the reference image and whose density values are larger than a given value; a step of extracting a second accumulated histogram by accumulating the weighting values of the weighting image corresponding to pixels in the low density region of the reference image and whose density values are smaller than a given value; a step of generating a summated accumulated histogram by summating the first accumulated histogram and the second accumulated histogram; and a step of recognizing the input grayscale image by using a distance value of the reference image and the input grayscale image which is a minimum value of the summated histogram.

Also, the reference image may include a third density region as a non-calculation region. At the processing of extracting a first accumulated histogram and extracting a second accumulated histogram, pixels in the third density region are excluded from the extracting of the accumulated histograms.

Also, the pattern recognizing program may be designed to instruct the computer to execute: a processing of setting a partial region image from an original image; and a processing of scaling the partial region image to become a same image as the reference image. At the pattern matching processing, the scaled partial region image is matched with the reference image.

According to the present invention, while maintaining a comparable precision similar to the binary image generation round-robin method, it is possible to perform a pattern recognition by optimally adapting an input grayscale image to a binary reference image at a higher speed. That is, the binarizing process and the distance calculation process are not required to be carried out repeatedly in accordance with various threshold values. Thus, the result having similar quality to the binary image generation round-robin method can be obtained at a higher speed.

BRIEF DESCRIPTION OF DRAWINGS

FIG. 12 is a view for explaining a density histogram used in an executing process for a pattern recognition;

BEST MODE FOR CARRYING OUT THE INVENTION

A First Exemplary Embodiment

Figure 1:
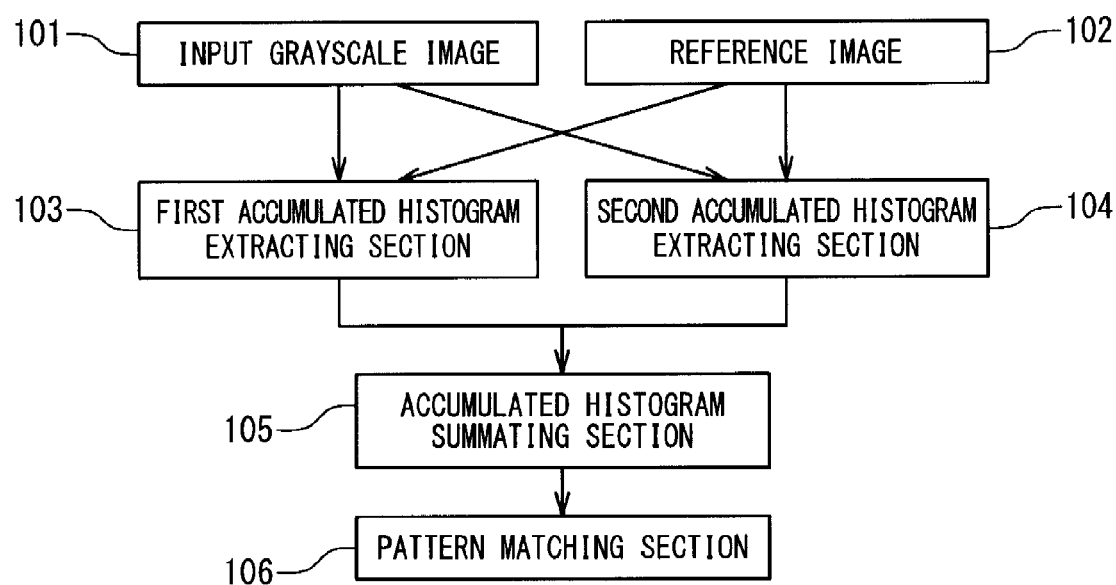
FIG. 1 is a block diagram showing a configuration of a first exemplary embodiment of a pattern recognizing apparatus according to the present invention.

A first exemplary embodiment of the present invention will be described below with reference to the accompanying drawings. FIG. 1 is a block diagram showing a configuration of a first exemplary embodiment of the pattern recognizing apparatus according to the present invention. As shown in FIG. 1, the pattern recognizing apparatus includes a first accumulated histogram extracting section 103, a second accumulated histogram extracting section 104, an accumulated histogram summating section 105 and a pattern matching section 106.

The pattern recognizing apparatus is specifically realized by an information processing apparatus exemplified by the workstation and the personal computer. In this exemplary embodiment, an input grayscale image 101 is inputted through an image inputting section and stored in an image storing section. A reference image 102 represented by the binary value is inputted from, for example, the image inputting section and stored in a reference image storing section. The first accumulated histogram extracting section 103, the second accumulated histogram extracting section 104, the accumulated histogram summating section 105 and the pattern matching section 106 are realized by a controlling section in the pattern recognizing apparatus. The controlling section is specifically realized by a CPU in the information processing apparatus that is operated in accordance with a program.

Figure 3:
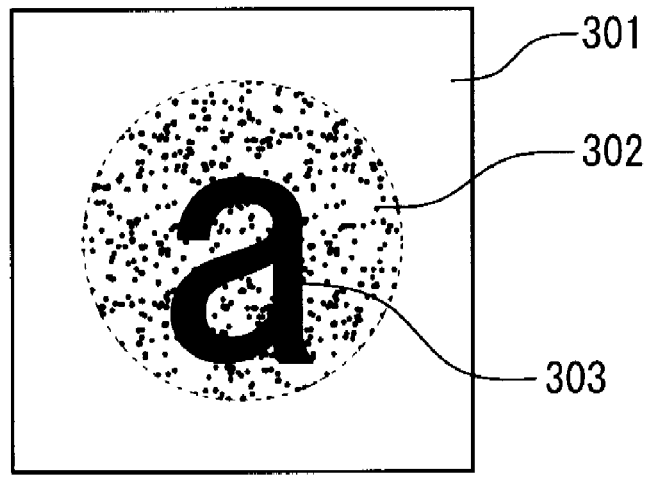
FIG. 3 is a view for explaining an example of the input grayscale image.

The input grayscale image 101 is an image of the recognition target that is represented in grayscale. The longitudinal and lateral sizes of the input grayscale image 101 are same to those of the reference image 102. FIG. 3 is a view for explaining an example of the input grayscale image. In the input grayscale image shown in FIG. 3, a gray circle 302 is drawn on a white background 301, and a character "a" 303 is drawn in the circle 302. In FIG. 3, in the region being drawn in denser, the density value is higher. Namely, the density values of the respective regions are indicated such as the background 301<the circle 302<the character "a" 303. The range to which the density value can belong is set between, for example, 0 and 255. The reference image 102 is a binary image. The pixel in the high brightness region of the reference image 102 has an attribute value "1", and the pixel in the low brightness range of the reference image 102 has an attribute value "2", as a pixel value.

Figure 4:
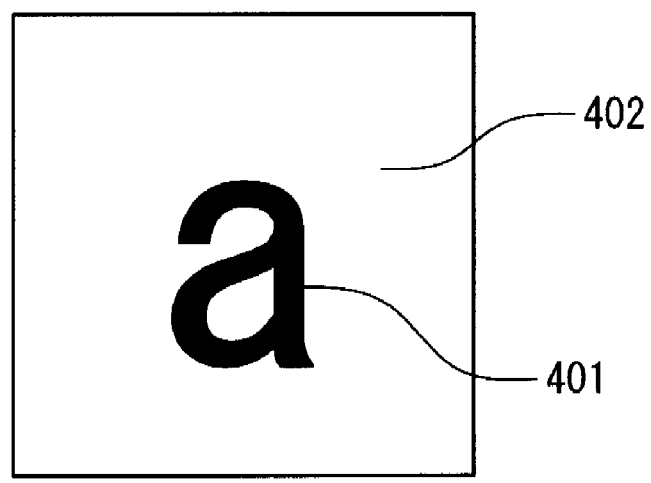
FIG. 4 is a view for explaining an example of the image used in a pattern recognition.

FIG. 4 is a view for explaining an example of the image used in the pattern recognition. A character "a" is indicated as a reference image. When the input grayscale image shown in FIG. 3 is the target of the recognition, the attribute value "1" is assigned to a high density region 401, and the attribute value "2" is assigned to a low density region 402.

The first accumulated histogram extracting section 103, when the input grayscale image 101 and the reference image 102 are matched, generates a first accumulated histogram Af(i) indicating the number of the pixels whose density values are less than i, for the pixels in the grayscale image corresponding to the pixels having the attribute value 1 on the reference image. That is, among the pixels in the grayscale image corresponding to the pixels having the attribute value 1 on the reference image, when the number of the pixels whose density values are i is represented as Hf(i), Af(i) is represented by:

$$Af(i)=Hf(0)+Hf(1)+\cdots+Hf(i-1) \quad (1)$$

Af(i) is the monotonically increasing function.

The second accumulated histogram extracting section 104 generates an opposite accumulated histogram, second accumulated histogram Ab(i) indicating the number of the pixels whose density values are i or more, among the pixels in the grayscale image corresponding to the pixels having the attribute value 2 on the reference image 102. That is, among the pixels in the grayscale image corresponding to the pixels having the attribute value 2 on the reference image, when the number of the pixels whose density values are i is represented as Hb(i), Ab(i) is represented by:

$$Ab(i)=Hb(255)+Hb(254)+\cdots+Hb(i) \quad (2)$$

Ab(i) is the monotonically decreasing function.

The accumulated histogram summating section 105 adds the first accumulated histogram Af(i) and the second accumulated histogram Ab(i) in accordance with the equation (3) to extracts a summated accumulated histogram At(i).

$$At(i)=Af(i)+Ab(i) \quad (3)$$

The pattern matching section 106 extracts the minimum value from At(i) {i=0, 1, 2, - - - , 255}, and if the value is smaller than a preset threshold value Dthr, judges that the input image is the recognition target indicated by the reference image.

Figure 2:
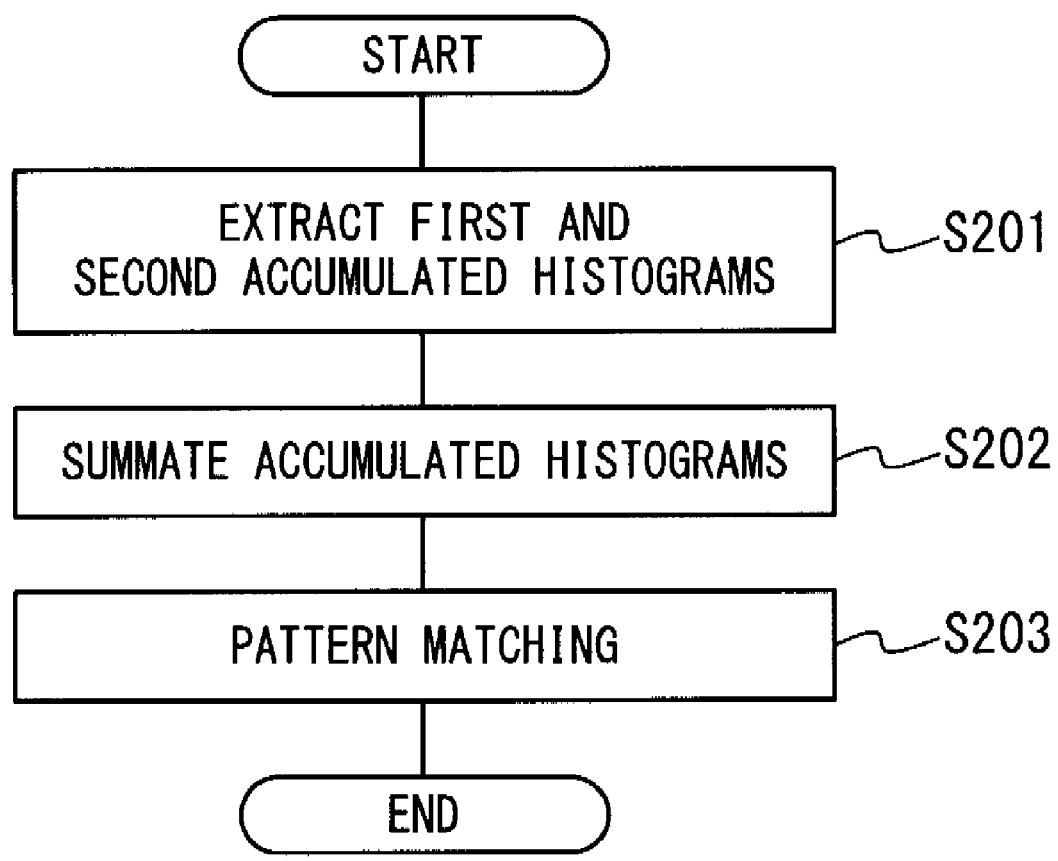
FIG. 2 is a flowchart showing an example of a processing step performed by a pattern recognizing apparatus.

The operation of the pattern recognizing apparatus will be described below in detail with reference to the accompanying drawings. FIG. 2 is a flowchart showing an example of the processing performed by the pattern recognizing apparatus. The first accumulated histogram extracting section 103 extracts the first accumulated histogram from the input grayscale image 101 and the reference image 102. The second accumulated histogram extracting section 104 extracts the second accumulated histogram from the input grayscale image 101 and the reference image 102 (Step S201). One example of this processing will be described below in detail with reference to FIGS. 3 to 6.

Figure 5A:
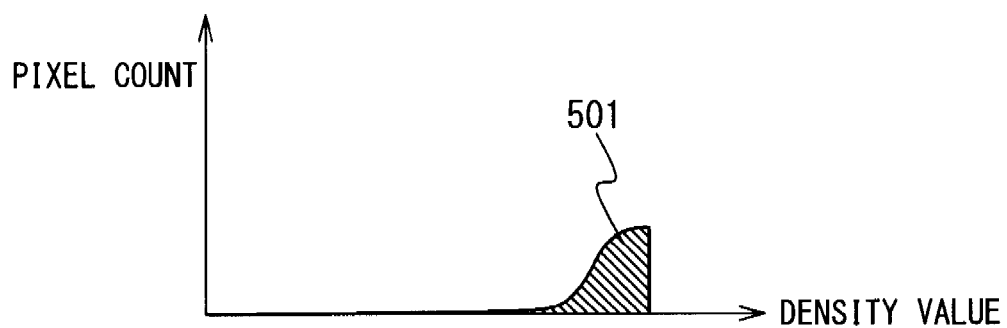
FIG. 5A is an explanation view showing an example of Hf(i)
Figure 5B:
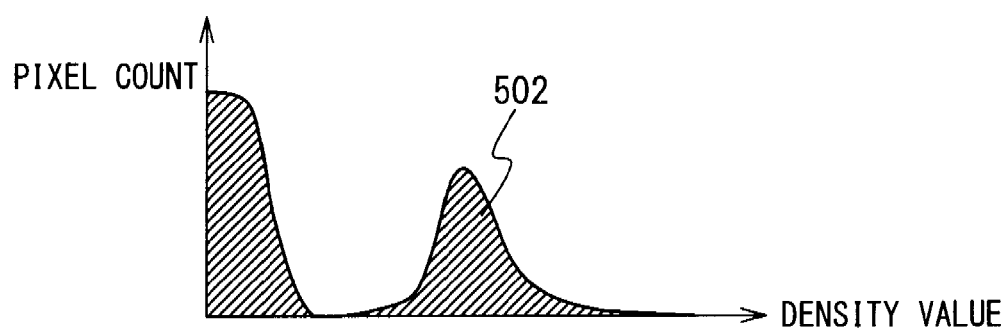
FIG. 5B is an explanation view showing an example of Hb(i)

FIGS. 5A, 5B are views for explaining examples of Hf(i) and Hb(i), respectively. FIG. 5A and FIG. 5B show examples of Hf(i) 501 and Hb(i) 502 when the input grayscale image 101 shown in FIG. 3 and the reference image 102 shown in FIG. 4 are matched, respectively. Most of the character "a" 303 corresponds to the high density region 401. Thus, in the Hf(i) 501, high frequencies (large number of pixels) concentrate on the region of a high density value. On the other hand, most of the background 301 and the circle 302 correspond to the low density region 402. Thus, the Hb(i) 502 distribution has two peaks in region between the low concentration and middle concentration regions.

Figure 6A:
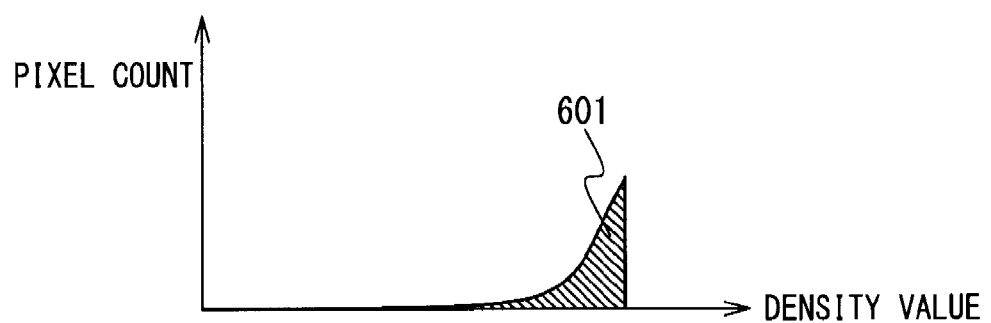
FIG. 6A is an explanation view showing an example of Af(i)
Figure 6B:
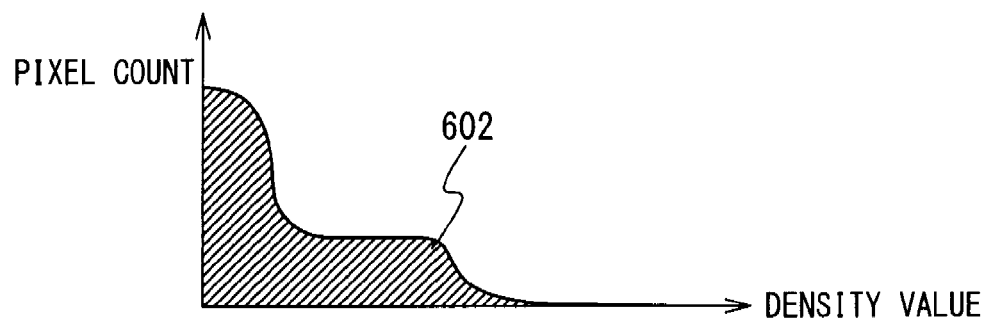
FIG. 6B is an explanation view showing an example of At(i)

FIGS. 6A, 6B are views for explaining examples of the Af(i) and the Ab(i), respectively. FIG. 6A indicates a first accumulated histogram 601, which is extracted from the Hf(i) 501 and indicated in the equation (1) as Af(i). FIG. 6B indicates a second accumulated histogram 602, which is extracted from the Hb(i) 502 and indicated in the equation (2) as Ab(i). The first accumulated histogram 601, since indicating the number of the pixels whose density values are less than i, has the shape of the monotonically increasing histogram. On the other hand, the second accumulated histogram 602, since indicating the number of the pixels whose density values are i or more, has the shape of the monotonically decreasing histogram.

The accumulated histogram summating section 105 generates a summated accumulated histogram 701 by summating the first accumulated histogram 601 and the second accumulated histogram 602 (Step S202).

Figure 7:
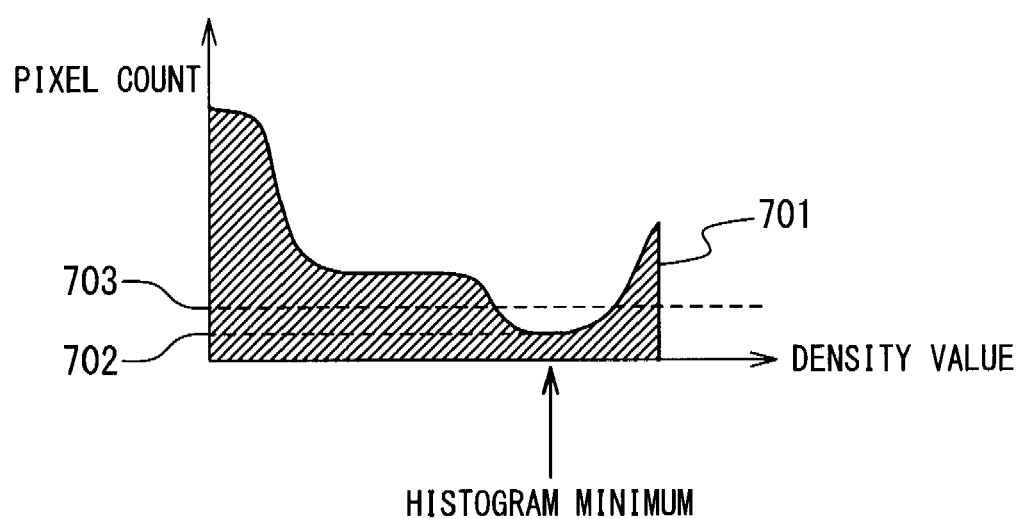
FIG. 7 is an explanation view showing an example of Ab(i)

FIG. 7 is a view for explaining an example of the At(i). FIG. 7 shows the summated accumulated histogram that is the At(i) of the equation (3) calculated by summating the first accumulated histogram 601 and the second accumulated histogram 602.

The pattern matching section 106 performs the pattern matching by using the summated accumulated histogram 701 (Step S203). That is, the pattern matching section 106 extracts the minimum value in the summated accumulated histogram 701, compares the minimum value with the preset threshold value Dthr, and judges that the input image is the recognition target if the minimum value in the summated accumulated histogram 701 is equal to or less than the threshold value Dthr. Reversely, if the minimum value of the summated accumulated histogram 701 is larger than the threshold value Dthr, the input image is judged not to be the recognition target. In the example shown in FIG. 7, the minimum value in the summated accumulated histogram 701 is a summated accumulated histogram minimum value 702, and this is less than a threshold value 703. Thus, the pattern matching section 106 judges that the input grayscale image 101 is the recognition target.

Figure 8A:
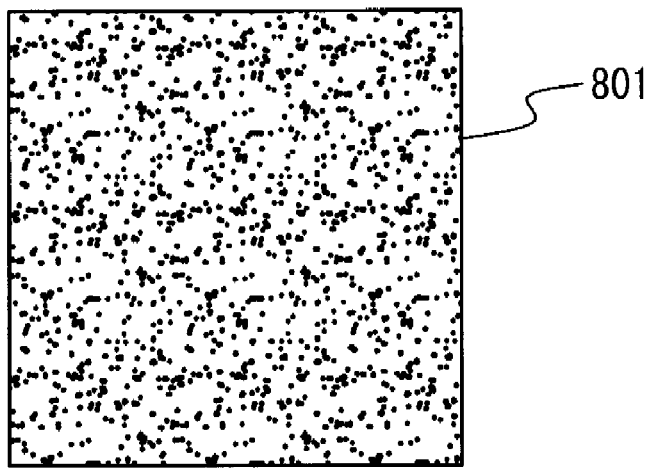
FIG. 8A is a view for explaining an example of an output result of each unit when the density of an input grayscale image is approximately uniform.
Figure 8B:
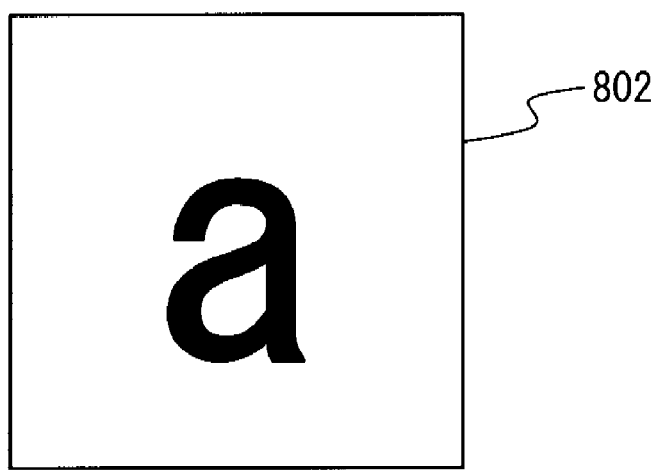
FIG. 8B is a view for explaining an example of an output result of each unit when the density of an input grayscale image is approximately uniform.
Figure 8C:
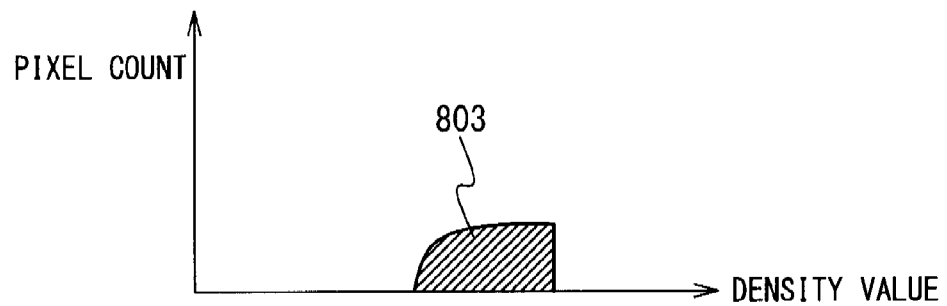
FIG. 8C is a view for explaining an example of an output result of each unit when the density of an input grayscale image is approximately uniform.
Figure 8D:
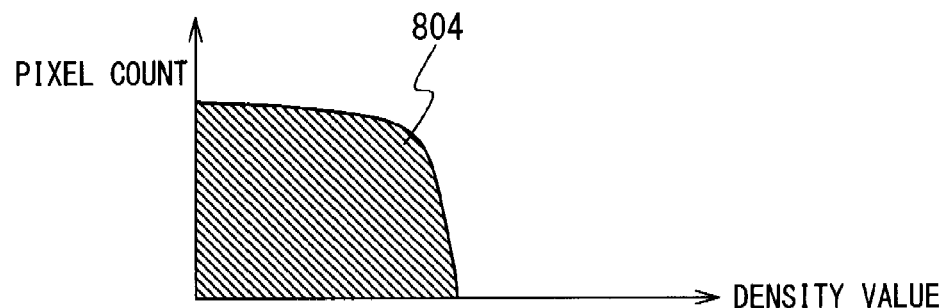
FIG. 8D is a view for explaining an example of an output result of each unit when the density of an input grayscale image is approximately uniform.
Figure 8E:
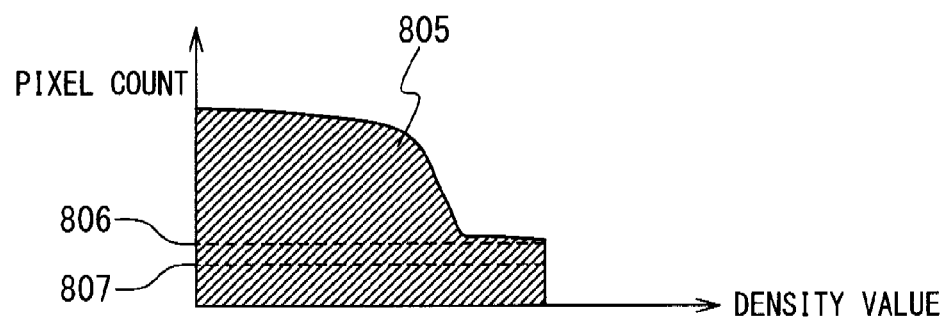
FIG. 8E is a view for explaining an example of an output result of each unit when the density of an input grayscale image is approximately uniform.

An example in which the input image does not include the recognition target is explained in detail by using FIGS. 8A to 8E. FIGS. 8A to 8E are views for explaining an example of the output results of the respective sections when the density of the input grayscale image is approximately uniform. FIG. 8A shows an input grayscale image 801, and FIG. 8B shows a reference image 802. The input grayscale image 801 indicates an image whose pixel values are roughly uniform in the entire image. FIG. 8C shows a first accumulated histogram 803, and FIG. 8D shows a second accumulated histogram 804. Also, FIG. 8E shows a summated accumulated histogram 805. The first accumulated histogram 803, the second accumulated histogram 804 and the summated accumulated histogram 805 are respectively obtained with regard to the input grayscale image 801 and the reference image 802. The summated accumulated histogram minimum value 806 which is the minimum value in the summated accumulated histogram 805 is larger than a threshold value 807. Thus, the input image is judged not to be the recognition target.

As explained above, by comparing the minimum value in the summated accumulated histogram with the threshold value Dthr, it can be judged whether or not the input image is the recognition target.

Also, in the above-mentioned exemplary embodiment, the reference image is supposed to be an image format. However, if the equivalent information can be represented, it is not limited to the image format. For example, the data listing the positions of pixels having the attribute value "1" are listed is allowable.

Also, in the above-mentioned exemplary embodiment, the reference image is supposed to be a binary image which is composed of the pixels of the attribute value "1" and the pixels of the attribute value "2." However, the reference image may be a ternary image that includes the third attribute value indicating the non-calculation region. An example of the ternary image is shown in FIG. 9 and FIG. 10.

Figure 9:
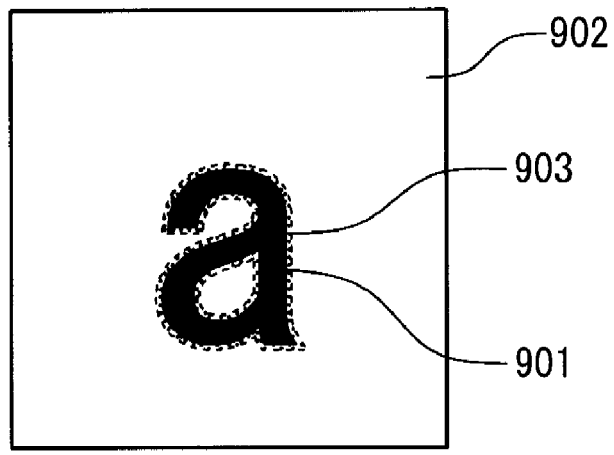
FIG. 9 is a view for explaining an example of a reference image which is a ternary image.

FIG. 9 is a view for explaining an example of the ternary reference image. As shown in FIG. 9, the reference image includes a third region 903 having the third attribute value around the boundary of the high density region 901 whose attribute value is "1" and the low density region 902 whose attribute value is "2." The first accumulated histogram extracting section 103 and the second accumulated histogram extracting section 104 do not include the third region 903 in the target of the histogram generation. That is, in the first accumulated histogram extracting section 103 and the second accumulated histogram extracting section 104, the pixels included in the third region 903 is excluded from the processing of extracting the accumulated histogram. When the foregoing reference image is used, the region having the third attribute value is not considered in the histogram calculation. Thus, even if the positions of the input grayscale image and the reference image are slightly dislocated in the upper, lower, right or left direction, it is possible to reduce the influence on the summated accumulated histogram value which is caused by the dislocation. Hence, as compared with the case of using the binary reference image, it is possible to configure the pattern recognizing apparatus that is robust against the position dislocation.

Figure 10:
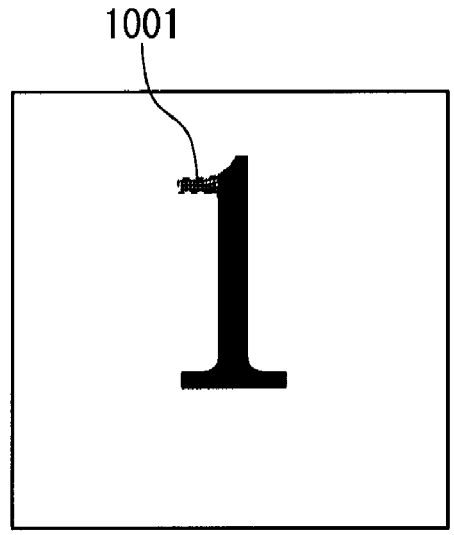
FIG. 10 is a view for explaining another example of a reference image which is a ternary image.

FIG. 10 is a view for explaining another example of the ternary reference image. FIG. 10 shows the ternary reference image having a third region 1001 that has the third attribute value only in a hook portion which is the short bar extending to the right side from the top end of the longitudinal bar of a numeral character "1." It is possible to attain the reference image that corresponds to both of "1" with the hook portion and "1" without the hook portion.

Also, a basic representation of the ternary reference image is as shown in FIG. 9 and FIG. 10, in which each pixel has one of the ternary pixel values. However, even in the case of the representation using the two images of a binary reference image and another binary image indicating only the non-calculation region, the similar effect can be achieved. Thus, such images are also referred to as the ternary reference image.

A Second Exemplary Embodiment

Figure 11:
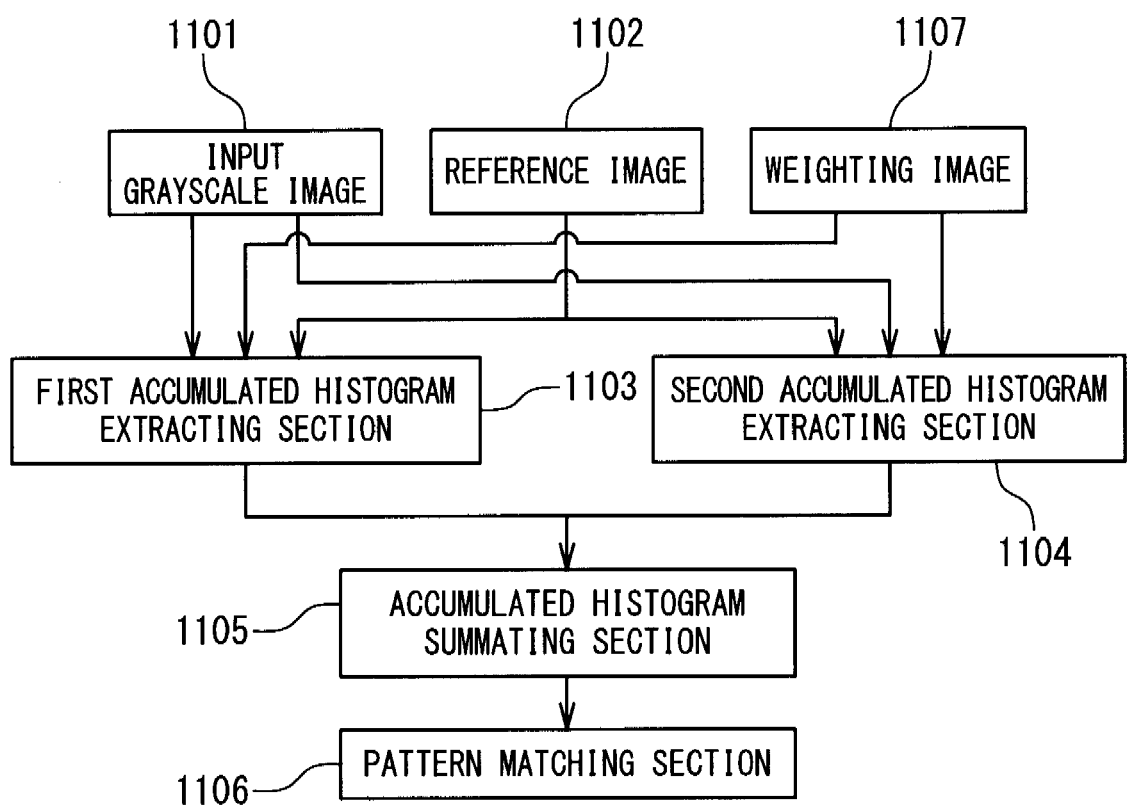
FIG. 11 is a block diagram showing a configuration of a second exemplary embodiment of the pattern recognizing apparatus according to the present invention.

A second exemplary embodiment of the present invention will be described below with reference to the accompanying drawings. FIG. 11 is a block diagram showing the configuration of a second exemplary embodiment of the pattern recognizing apparatus according to the present invention. As shown in FIG. 11, the pattern recognizing apparatus includes an input grayscale image 1101, a reference image 1102 represented by a binary value, a first accumulated histogram extracting section 1103, a second accumulated histogram extracting section 1104, an accumulated histogram summating section 1105 and a pattern matching section 1106. The first accumulated histogram extracting section 1103, the second accumulated histogram extracting section 1104, the accumulated histogram summating section 1105 and the pattern matching section 1106 are realized by, for example, a controlling apparatus in the pattern recognizing apparatus, similarly to the first exemplary embodiment. This exemplary embodiment differs from the case of the pattern recognizing apparatus shown in FIG. 1, in that a weighting image 1107 indicating the importance degree for each pixel is referred. The weighting image 1107 is inputted, for example, from the image inputting section and stored in a weighting image storing section.

The functions of the weighting image 1107, the first accumulated histogram extracting section 1103 and the second accumulated histogram extracting section 1104 will be described below, mainly with the functions different from the first exemplary embodiment.

The weighting image 1107 indicating the importance degree for each pixel numerically represents the importance degree of each pixel when a pattern is recognized and has the same longitudinal and lateral sizes to the input grayscale image 1101 and the reference image 1102. For example, when the every pixel is equally made contribute to the recognition, all of the pixel values are set to 1. When the pattern recognizing apparatus in which the difference between a character "e" and an umlauted character "ë" is outstandingly recognized is desired, the pixel values in the region located in the upper portion of the symbol where the umlaut symbol exists are set to be larger than the other portions.

The first accumulated histogram extracting section 1103 correlates the respective pixels of the input grayscale image 1101, the reference image 1102 and the weighting image 1107 to extract the sum of the pixel values of the weighting images correlated to the pixels whose density values are less than i, among the pixels in the grayscale image correlated to the pixels in the high density region on the reference image, as the first accumulated histogram Af(i). That is, the Af(i) is given by the following equation.

$$Af(i) = \sum_y \sum_x \{\delta_f(D(x, y), I(x, y), i) \cdot W(x, y)\} \quad (4)$$

In this equation, D(x, y) is the pixel value of the reference image at the coordinates (x, y), and I(x, y) is the pixel value of the input grayscale image at the coordinates (x, y), and W(x, y) is the pixel value of the weighting image at the coordinates (x, y). Then, $\delta$ f(D(x, y), I(x, y), i) is the function for returning a value 1 only when the pixel value D(x, y) of the reference image is the pixel value indicating the high density region, and the pixel value I(x, y) of the input grayscale image is less than i, and returning a value 0 in the case except it.

Similarly, the second accumulated histogram extracting section 1104 correlates the respective pixels of the input grayscale image 1101, the reference image 1102 and the weighting image 1107 to extract the sum of the pixel values of the weighting images correlated to the pixels whose density values are i or more, among the pixels in the grayscale image correlated to the pixels in the low density region on the reference image, as the second accumulated histogram Ab(i). That is, the Ab(i) is given by the following equation.

$$Ab(i) = \sum_y \sum_x \{\delta_b(D(x, y), I(x, y), i) \cdot W(x, y)\} \quad (5)$$

In this equation, $\delta$ b(D(x, y), I(x, y), i) is the function for returning the value 1 only when the pixel value D(x, y) of the reference image is the pixel value indicating the low density region, and the pixel value I(x, y) of the input grayscale image is the value i more, and returning the value 0 in the case except it.

The accumulated histogram summating section 1105 summates the first accumulated histogram Af(i) and the second accumulated histogram Ab(i) in accordance with the equations (4) and (5) and extracts the summated accumulated histogram At(i) in accordance with the equation (3).

The pattern matching section 1106 extracts the minimum value from At(i) {i=0, 1, 2, - - - , 255}, and if its value is smaller than the preset threshold value Dthr, judges that the input image is the recognition target indicated by the reference image.

The operation of the pattern recognizing apparatus in this exemplary embodiment is similar to the operation of the pattern recognizing apparatus in the first exemplary embodiment, and the operation of the pattern recognizing apparatus in this exemplary embodiment is described with reference to FIG. 2. The first accumulated histogram extracting section 1103 and the second accumulated histogram extracting section 1104 extract the first accumulated histogram and the second accumulated histogram from the input grayscale image 1101, the reference image 1102 and the weighting image 1107, as shown in FIG. 2 (Step S201). The accumulated histogram summating section 1105 summates the first accumulated histogram and the second accumulated histogram to generate the summated accumulated histogram (Step S202). The pattern matching section 1106 uses the summated accumulated histogram to perform the pattern comparison (Step S203).

In this exemplary embodiment, when the first accumulated histogram and the second accumulated histogram are extracted, the pixel values of the weighting image 1107 are taken into account. It can be understood that the pattern recognition is judged in accordance with the minimum value of the so-called weighted city block distance is set.

In this exemplary embodiment, the pattern recognition having the tendency that the minimum value of the summated accumulated histogram appears in the threshold under which the pixels of the input image having the relatively high importance in pattern recognition matches with the pixels of the reference image when the pattern is attained, as compared with the first exemplary embodiment.

A Third Exemplary Embodiment

Figure 13:
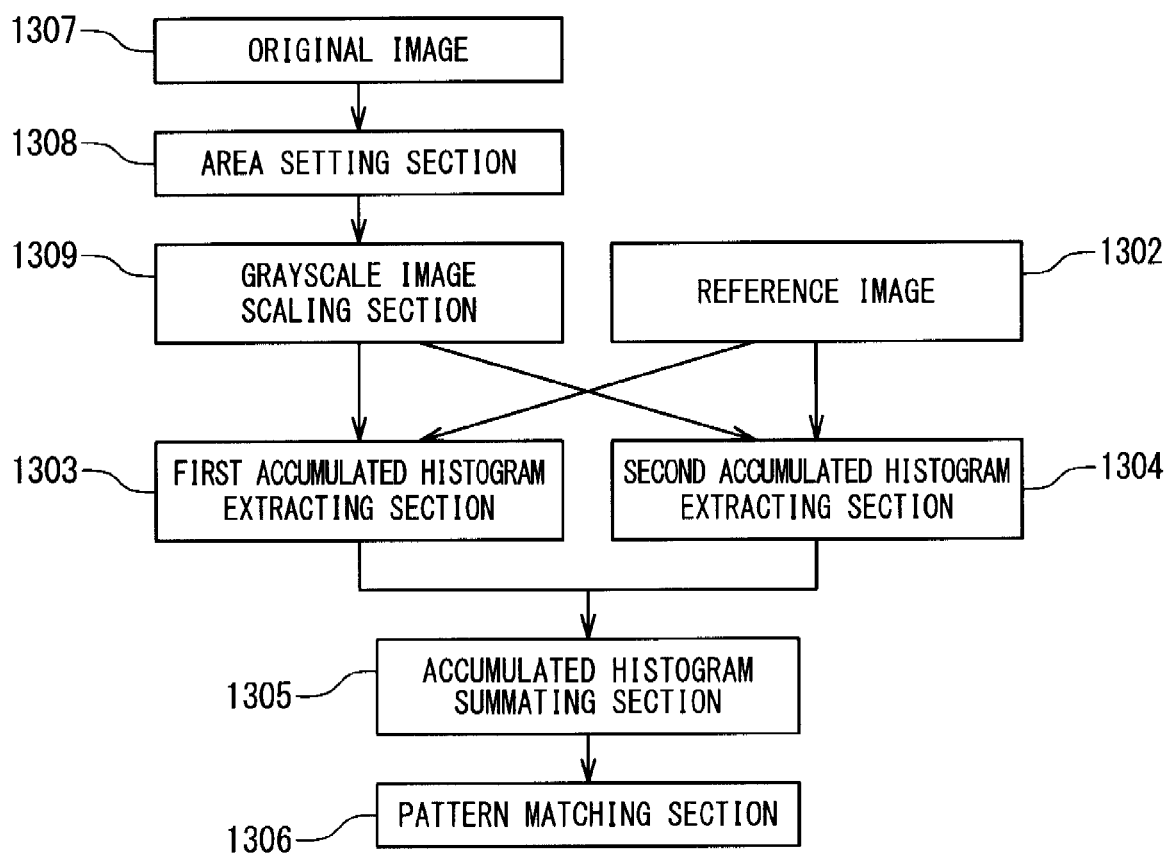
FIG. 13 is a block diagram showing a configuration of a third exemplary embodiment of the pattern recognizing apparatus according to the present invention.

A third exemplary embodiment of the present invention will be described below with reference to the accompanying drawings. FIG. 13 is a block diagram showing the configuration of a third exemplary embodiment in the pattern recognizing apparatus according to the present invention. As shown in FIG. 13, in the pattern recognizing apparatus in this exemplary embodiment, differently from the case of the pattern recognizing apparatus shown in FIG. 1, a first accumulated histogram extracting section 1303 does not receive the input grayscale image but receives the image outputted by a grayscale image scaling section 1309, Also, the pattern recognizing apparatus further contains: a region setting section 1308 for setting a plurality of partial regions in an original image 1307 represented by grayscale; and the grayscale image scaling section 1309 for scaling each partial region image set by the region setting section to the same size as the reference image. The region setting section 1308, the grayscale image scaling section 1309, the first accumulated histogram extracting section 1303, a second accumulated histogram extracting section 1304, an accumulated histogram summating section 1305 and a pattern matching section 1306 are attained by, for example, the controlling section in the pattern recognizing apparatus, similarly to the first exemplary embodiment.

The original image 1307 is the image of the recognition target represented by the grayscale. The size of the original image 1307 may differ from a reference image 1302. For example, when the reference image 1302 represents one character shown in FIG. 4, the original image 1307 may be the grayscale image of an entire sheet on which characters are written. Also, when the reference image 1302 indicates one traffic sign, the original image 1307 may be the image of a road landscape.

The region setting section 1308 sets the range of the various regions satisfying a preset condition in the original image 1307. The preset condition is, for example, a rule to limit the longitudinal and lateral sizes of the region, or a rule to narrow down the candidate regions by using an advanced identification function and the like.

The grayscale image scaling section 1309 scales each partial region image set by the region setting section 1308 to the same size as the reference image 1302. In the case of enlarging, the pixel is interpolated by using a nearest neighbor method, a bilinear interpolation method, a bicubic method and the like.

Figure 14:
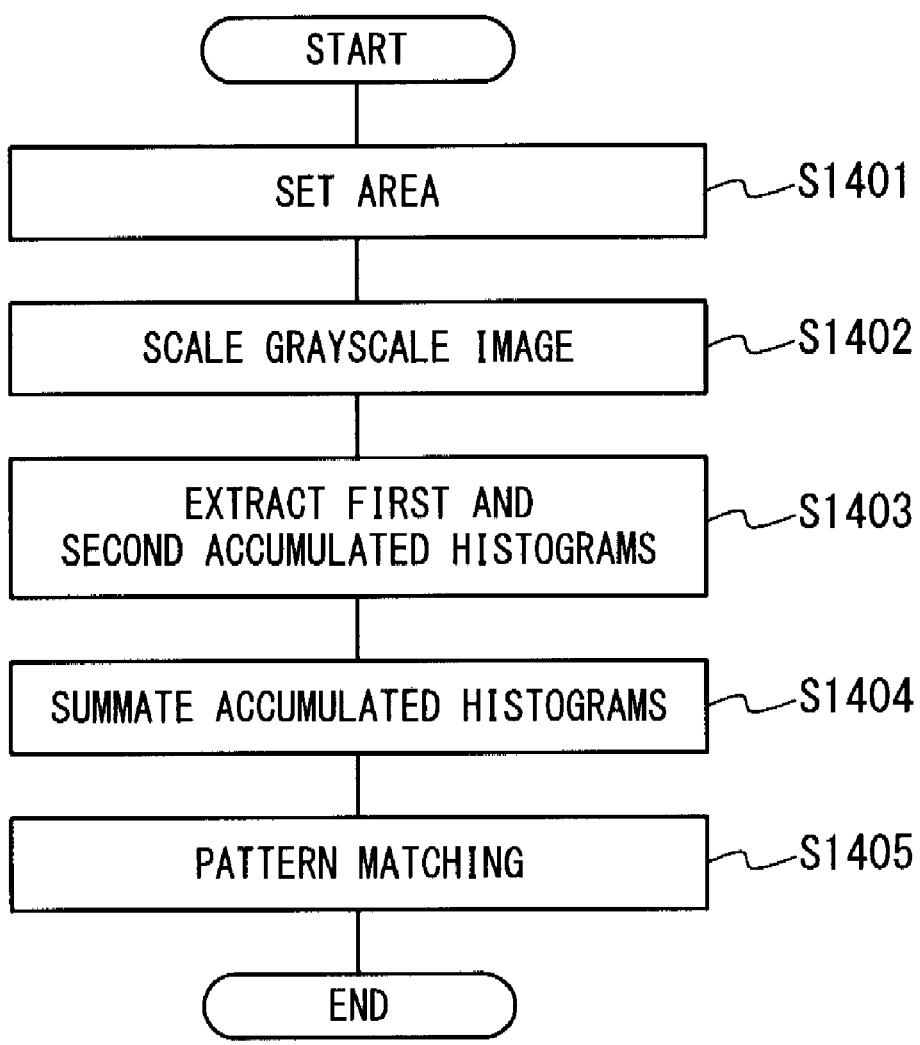
FIG. 14 is a flowchart showing an example of a processing step performed by a pattern recognizing apparatus.

The operation of the pattern recognizing apparatus will be described below in detail with reference to the drawings. FIG. 14 is the flowchart showing one example of the processing steps that are carried out by the pattern recognizing apparatus. At first, the region setting section 1308 sets one region of the processing target in the original image (Step S1401). Next, the grayscale image scaling section 1309 scales the set region image to become the same size as the reference image (Step S1402). The processes between a step 1403 and a step 1405, performed by the first accumulated histogram extracting section 1303, the second accumulated histogram extracting section 1304, the accumulated histogram summating section 1305 and the pattern matching section 1306, are similar to the processes between the step S201 and the step S203 performed by the first accumulated histogram extracting section 103, the second accumulated histogram extracting section 104, the accumulated histogram summating section 105 and the pattern matching section 106, as shown in FIG. 2.

After the pattern comparing process of the step S1405 for one region is finished, the controlling section in the pattern recognizing apparatus judges whether or not the other region to be processed still remains, and repeats the process from the step S1401 if it still remains.

According to this exemplary embodiment, by setting the partial region in the original image and converting into the same size as the reference image and then performing the pattern comparison, it is possible to detect the target if the recognition target exists in a part of the original image.

Also, the scaling is performed by the grayscale image scaling section 1309, so that even if the size of the recognition target in the original image 1307 differs from the reference image 1302, the comparison can be executed.

In this exemplary embodiment, the region setting section 1308 and the grayscale image scaling section 1309 are applied to the pattern recognizing apparatus shown in FIG. 1. However, the region setting section 1308 and the grayscale image scaling section 1309 may be applied to the pattern recognizing apparatus shown in FIG. 11.

As exemplified in the above-mentioned exemplary embodiments, the present invention can be applied to a pattern recognizing apparatus, a pattern recognizing method and a pattern recognizing program.

The invention claimed is:

1. A pattern recognizing apparatus comprising:
    a storing section configured to store a reference image being binarized and having a high density region and a low density region and an input grayscale image to be matched with the reference image;
    a first accumulated histogram extracting section configured to extract a first accumulated histogram generated by accumulating pixels whose density value is less than a given value among pixels of the input grayscale image and corresponding to the high density region of the reference image;
    a second accumulated histogram extracting section configured to extract a second accumulated histogram generated by accumulating pixels whose density value is more than a given value among pixels of the input grayscale image and corresponding to the low density region of the reference image;
    an accumulated histogram summating section configured to generate a summated accumulated histogram by summating the first accumulated histogram and the second accumulated histogram; and
    a pattern matching section configured to recognize the input grayscale image by using a distance value of the reference image and the input grayscale image which is a minimum value of the summated histogram generated by the accumulated histogram summating section.

2. The pattern recognizing apparatus according to claim 1, wherein the storing section stores a weighting image having weighting values for every pixel;
    the first accumulated histogram extracting section extracts the first accumulated histogram by accumulating the weighting values of the weighting image corresponding to pixels in the high density region of the reference image and whose density values are larger than a given value; and
    the second accumulated histogram extracting section extracts the second accumulated histogram by accumulating the weighting values of the weighting image corresponding to pixels in the low density region of the reference image and whose density values are smaller than a given value.

3. The pattern recognizing apparatus according to claim 1, wherein the reference image includes a third density region as a non-calculation region,
    the first accumulated histogram extracting section excludes pixels in the third density region from the extracting of the first accumulated histogram, and
    the second accumulated histogram extracting section excludes pixels in the third density region from the extracting of the second accumulated histogram.

4. The pattern recognizing apparatus according to claim 1, further comprising:
    a region setting section configured to set a partial region image from an original image; and
    a grayscale image scaling section configured to scale the partial region image to become a same image as the reference image,
    wherein the grayscale scaling section sets the scaled partial region image as the input grayscale image to be matched with the reference image.

5. A pattern recognizing method comprising:
(a) storing a reference image being binarized and having a high density region and a low density region and an input grayscale image to be matched with the reference image;
(b) extracting a first accumulated histogram generated by accumulating pixels whose density value is less than a given value among pixels of the input grayscale image and corresponding to the high density region of the reference image;
(c) extracting a second accumulated histogram generated by accumulating pixels whose density value is more than a given value among pixels of the input grayscale image and corresponding to the low density region of the reference image;
(d) generating a summated accumulated histogram by summating the first accumulated histogram and the second accumulated histogram; and
(e) recognizing the input grayscale image by using a distance value of the reference image and the input grayscale image which is a minimum value of the summated histogram.

6. The pattern recognizing method according to claim 5, further comprising:
storing a weighting image having weighting values for every pixel,
wherein at (b) extracting, the first accumulated histogram is extracted by accumulating the weighting values of the weighting image corresponding to pixels in the high density region of the reference image and whose density values are larger than a given value; and
at(c) extracting, the second accumulated histogram is extracted by accumulating the weighting values of the weighting image corresponding to pixels in the low density region of the reference image and whose density values are smaller than a given value.

7. The pattern recognizing method according to claim 5, wherein the reference image includes a third density region as a non-calculation region,
at (b) extracting the first accumulated histogram, pixels in the third density region are excluded from the extracting of the first accumulated histogram, and
at (c) extracting the second accumulated histogram, pixels in the third density region are excluded from the extracting of the second accumulated histogram.

8. The pattern recognizing method according to claim 5, further comprising:
(f) setting a partial region image from an original image; and
(g) scaling the partial region image to become a same image as the reference image,
wherein the scaled partial region image is set as the input grayscale image to be matched with the reference image.

9. A computer program product embodied on a non-transitory computer-readable medium and comprising code that, when executed, causes a computer to perform the following:
(a) storing a reference image being binarized and having a high density region and a low density region and an input grayscale image to be matched with the reference image;
(b) extracting a first accumulated histogram generated by accumulating pixels whose density value is less than a given value among pixels of the input grayscale image and corresponding to the high density region of the reference image;
(c) extracting a second accumulated histogram generated by accumulating pixels whose density value is more than a given value among pixels of the input grayscale image and corresponding to the low density region of the reference image;
(d) generating a summated accumulated histogram by summating the first accumulated histogram and the second accumulated histogram; and
(e) recognizing the input grayscale image by using a distance value of the reference image and the input grayscale image which is a minimum value of the summated histogram.

10. The computer program product according to claim 9, further causes the computer to perform the following:
(f) storing a weighting image having weighting values for every pixel,
wherein at (b) extracting, the first accumulated histogram is extracted by accumulating the weighting values of the weighting image corresponding to pixels in the high density region of the reference image and whose density values are larger than a given value; and
at (c) extracting, the second accumulated histogram is extracted by accumulating the weighting values of the weighting image corresponding to pixels in the low density region of the reference image and whose density values are smaller than a given value.

11. The program according to claim 9, wherein the reference image includes a third density region as a non-calculation region,
at (b) extracting the first accumulated histogram, pixels in the third density region are excluded from the extracting of the first accumulated histogram, and
at (c) extracting the second accumulated histogram, pixels in the third density region are excluded from the extracting of the second accumulated histogram.

12. The program according to claim 9, further causes the computer to perform the following:
(f) setting a partial region image from an original image; and
(g) scaling the partial region image to become a same image as the reference image,
wherein the scaled partial region image is set as the input grayscale image to be matched with the reference image.

* * * * *